United States Patent
Haraldsson et al.

(10) Patent No.: US 10,975,246 B2
(45) Date of Patent: Apr. 13, 2021

(54) COATING AND PRIMER

(71) Applicant: Mercene Coatings AB, Stockholm (SE)

(72) Inventors: Tommy Haraldsson, Järfälla (SE); Henrik Mikaelsson, Bandhagen (SE); Carl Fredrik Carlborg, Stockholm (SE); Jowan Rostami, Järfälla (SE)

(73) Assignee: MERCENE COATINGS AB, Stockholm (SE)

( * ) Notice: Subject to any disclaimer, the term of this patent is extended or adjusted under 35 U.S.C. 154(b) by 0 days.

(21) Appl. No.: 17/041,135

(22) PCT Filed: Mar. 4, 2019

(86) PCT No.: PCT/EP2019/055304
§ 371 (c)(1),
(2) Date: Sep. 24, 2020

(87) PCT Pub. No.: WO2019/185302
PCT Pub. Date: Oct. 3, 2019

(65) Prior Publication Data
US 2021/0047519 A1 Feb. 18, 2021

(30) Foreign Application Priority Data

Mar. 27, 2018 (SE) .................................. 1850341-7
Dec. 19, 2018 (SE) .................................. 1851613-8

(51) Int. Cl.
| | |
|---|---|
| *B05D 3/06* | (2006.01) |
| *B05D 7/00* | (2006.01) |
| *C09D 4/00* | (2006.01) |
| *C09D 5/00* | (2006.01) |
| *C08F 222/06* | (2006.01) |
| *C08K 5/17* | (2006.01) |
| *C08F 222/14* | (2006.01) |
| *C08F 220/18* | (2006.01) |
| *C08F 2/50* | (2006.01) |
| *C08F 222/40* | (2006.01) |

(52) U.S. Cl.
CPC .................. *C09D 4/00* (2013.01); *C08F 2/50* (2013.01); *C08F 220/18* (2013.01); *C08F 222/06* (2013.01); *C08F 222/14* (2013.01); *C08F 222/40* (2013.01); *C08K 5/17* (2013.01); *C09D 5/002* (2013.01)

(58) Field of Classification Search
None
See application file for complete search history.

(56) References Cited

U.S. PATENT DOCUMENTS

| | | | |
|---|---|---|---|
| 6,127,447 A | 10/2000 | Mitry et al. | |
| 6,582,754 B1 | 6/2003 | Pasic et al. | |
| 10,016,532 B2 | 7/2018 | Zhang et al. | |
| 2003/0152767 A1 | 8/2003 | Hawkins | |
| 2010/0178440 A1 | 7/2010 | Jahromi et al. | |
| 2010/0272920 A1 | 10/2010 | Garnett | |
| 2015/0218408 A1 | 8/2015 | Becker | |
| 2019/0225817 A1* | 7/2019 | Ozcelik | A61L 27/18 |

FOREIGN PATENT DOCUMENTS

| | | |
|---|---|---|
| CN | 102558928 A | 7/2012 |
| CN | 104945983 A | 9/2015 |
| CN | 104945985 A | 9/2015 |
| CN | 106519919 A | 3/2017 |
| CN | 106634543 A | 5/2017 |
| EP | 0618237 A1 | 10/1994 |
| GB | 2542629 A | 3/2017 |
| WO | 2008005752 A2 | 1/2008 |
| WO | 2018022788 A1 | 2/2018 |

OTHER PUBLICATIONS

Gonzalez et al., Polymer Chemistry 2015, 6, 6987-6997.*
International Search Report and Written Opinion for corresponding International Application No. PCT/EP2019/055304 dated May 16, 2019.
International Preliminary Report on Patentability for corresponding International Application No. PCT/EP2019/055304 dated Feb. 18, 2020.

* cited by examiner

*Primary Examiner* — Vu A Nguyen
(74) *Attorney, Agent, or Firm* — Renner, Otto, Boisselle & Sklar, LLP

(57) ABSTRACT

There is provided a method of coating a substrate comprising at least one secondary amine, by contacting the substrate surface with a compound comprising at least one carbon-carbon double bond, wherein an electron withdrawing group is on at least one side of the carbon-carbon double bond, so that a complex is formed between nitrogen in the secondary amine and the carbon-carbon double bond. Then a reaction is initiated to form a covalent bond by reaction of nitrogen in the secondary amine and the carbon-carbon double bond, by subjecting at least a part of the formed complexes to actinic radiation, wherein the wavelength of the actinic radiation is adapted to be absorbed by the complex. When a further top-coat is added, the resulting surface has a high hardness, and the scratch resistance is improved.

15 Claims, No Drawings

COATING AND PRIMER

This application is a national phase of International Application No. PCT/EP2019/055304 filed Mar. 4, 2019 and published in the English language, which claims priority to Swedish Application No. filed 1851613-8 filed Dec. 19, 2018 and Swedish Application No. 1850341-7 filed Mar. 27, 2018, all of which are hereby incorporated herein by reference.

TECHNICAL FIELD

The present invention relates generally to a coating or a primer. A further coating, a top coating may or may not be applied on the coating. The thin coating is made by forming a complex between a secondary amine at the substrate surface and a carbon-carbon double bond in a molecule contacted with the surface, and then initiating a reaction forming a covalent bond by irradiating the complex.

BACKGROUND

GB 2 542 629 discloses a curable primer composition comprising copolymer where components of the copolymer may be substituted with an anhydride. The composition may further comprise a curable acrylate compound. The anhydride is not free but instead reacted to form the copolymer.

US 2003/01502767 discloses a primer composition comprising a polymer reacted with for instance maleic anhydride.

CN 104945983 and CN 104945985 disclose monofunctional methacrylates forming polymer chains with maleic acid anhydride. There is in a first step formed a poly-anhydride which in a subsequent step reacts with epoxy. Thus, the anhydride is reacted to a poly-anhydride. Since monofunctional methacrylates are used, no cross-linked network is formed. In the introduction there is disclosed that there is first synthesized an acrylic resin having pendant anhydride groups, which is then subjected to a modified epoxy resin, epoxy-modified acrylic resin prepared by the preparation of one-component epoxy modified acrylic coatings having excellent adhesion, good hardness and gloss.

Even the coatings and primers according to the state of the art are used today there is still room for an improvement regarding for instance the adhesion, at least for some materials.

CN 106519919 discloses a UV-curing composition, which may be added to a melamine substrate. The composition may comprise for instance an acrylate. A photoinitiator is present and initiates the curing reaction.

CN 102558928 discloses a UV-curing coating composition which can be used to coat melamine substrates. The coating may comprise different acrylates. A photoinitiator is present, initiating the curing reaction.

US 2010/272920 discloses a radiation curable composition which may comprise acrylates. They may be used on a melamine substrate. A photoinitiator is present.

US 2010/178440 discloses a UV-curable binder which may be applied on a base material of melamine. A photoinitiator or possibly another initiating mechanism such as e-beam is present.

US 2015/218408 discloses a process for coating sheets comprising applying a coating formulation to a sheet of paper which has been impregnated with melamine formaldehyde resins, carrying out at least partial radiation curing, and applying at least one further radiation-curable coating material, and finally carrying out complete curing by radiation. It should be noted that the melamine formaldehyde resins are not cured when contacted with the coating formulation.

CN 106634543 discloses a UV-curing primer comprising acrylates which may be applied on melamine. A photoinitiator is present.

WO 2008/005752 discloses a substrate (a contact lens) where the surface comprises an amine group (Scheme 1 and 2a). The molecule reacting with the amino group has a C=C double bond adjacent to an electron withdrawing group. The initiation is not made my irradiation of a formed complex.

U.S. Pat. No. 10,016,532 discloses an example where a surface is coated with a polymer primer. A polymer is grafted on the polymer primer. The primer may comprise a secondary amine (column 47, lines 54-64) and the group reacting with the amine may comprise a C=C double bond. The initiation is made with added initiators such as UV-initiators, heat initiators and redox initiators. The initation is not made by irradiation of formed complexes.

U.S. Pat. No. 6,582,754 discloses a process for coating a material surface, comprising the steps of: (a) covalently binding a compound comprising an ethylenically unsaturated double bond to the material surface; (b) polymerizing a monomer comprising a reactive or crosslinkable group on the surface and thereby providing a primary polymer coating comprising reactive or crosslinkable groups, (c) in case of a monomer comprising a reactive group in step (b) reacting the reactive groups of the primary coating with a further compound comprising an ethylenically unsaturated double bond and graft-polymerizing a hydrophilic monomer and optionally a co-monomer having a crosslinkable group onto the primary coating obtained according to step (b) and (d) in case of crosslinkable groups being present in step (b) or (c) initiating crosslinking of said groups.

EP 0 618 237 discloses a composition containing charge transfer complex from at least one unsaturated compound having an electron donor group and having an electron withdrawing group and being free of any photoinitiating compound is polymerized by being subjected to ultraviolet light.

U.S. Pat. No. 6,127,447 discloses a radiation curable coating composition is provided and includes an effective amount of cationic photoinitiator, in combination with a charge transfer complex, the charge transfer complex comprising at least one electron withdrawing reactant component and at least one electron donating reactant component free radically reactive therewith, the electron withdrawing reactant component comprising an unsaturated nitrogen containing compound and the electron donating reactant component comprising an unsaturated compound having at least one vinyl ether group, the electron donating reactant component may be separate from or structurally incorporated within the electron withdrawing reactant component and an effective amount of a cationic photoinitiator.

SUMMARY

It is an object of the present invention to obviate at least some of the disadvantages in the prior art and to provide an improved coating and/or primer.

In a first aspect there is provided a method of coating a substrate, said method comprising the steps of
a) providing a substrate, said substrate comprising at least one secondary amine, at least a fraction of the at least one secondary amines is at the surface of the substrate,
b) contacting the substrate surface with a compound comprising at least one carbon-carbon double bond, wherein an electron withdrawing group is on at least one side of the carbon-carbon double bond, so that a complex is formed between nitrogen in the secondary amine and the carbon-carbon double bond, c) initiating a reaction to form a covalent bond by reaction of nitrogen in the secondary amine and the carbon-carbon double bond, by subjecting at least a part of the formed complexes to actinic radiation, wherein the wavelength of the actinic radiation is adapted to be absorbed by the complex.

In a second aspect there is provided a substrate coated according to the method above.

The inventors have unexpectedly found that a reaction can be initiated between a secondary amine and a C=C double bond with adjoining electron withdrawing groups. It is required that actinic radiation reaches the substrate surface through a layer of applied solution, since the complexes are at the substrate surface. In the prior art photoinitiators or other UV-blocking compounds are utilized in similar systems which makes this method impossible to use or impossible to observe in most systems since no or too little actinic radiation reaches the complexes. The inventors believe that this is the reason for not having observed this effect before.

The invention is highly suitable for applications where an improved adhesion to various substrates is desired. For, instance melamine and other substrates comprising a secondary amine can successfully be coated. The adhesion of a subsequent top coat is greatly improved.

Further, in particular when a top coating is added on the coating, the resulting surface has a high hardness, and the scratch resistance is improved.

No photoinitiator is required. This is because the reaction is initiated by irradiating the complex so that the complex reacts and a covalent bond is formed.

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

As used herein (meth)acrylate is a general term that encompasses both acrylate and methacrylate.

In a first aspect there is provided a method of coating a substrate, said method comprising the steps of a) providing a substrate, said substrate comprising at least one secondary amine, at least a fraction of the at least one secondary amines is at the surface of the substrate, b) contacting the substrate surface with a compound comprising at least one carbon-carbon double bond, wherein an electron withdrawing group is on at least one side of the carbon-carbon double bond, so that a complex is formed between nitrogen in the secondary amine and the carbon-carbon double bond, c) initiating a reaction to form a covalent bond by reaction of nitrogen in the secondary amine and the carbon-carbon double bond, by subjecting at least a part of the formed complexes to actinic radiation, wherein the wavelength of the actinic radiation is adapted to be absorbed by the complex.

The substrate comprises molecules being secondary amines, which are accessible at the surface of the substrate to form complexes. A compound comprising at least one C=C double bond is added to the substrate. This compound forms a complex with the secondary amine. The complex is referred to as a complex. Complexes form spontaneously as the compound comprising at least one C=C double bond is contacted with the substrate surface.

Without wishing to be bound by any particular scientific theory, the inventors believe that this complex is a charge transfer (CT) complex. In such a complex, a fraction of electronic charge is transferred between the molecular entities. The resulting electrostatic attraction provides a stabilizing force for the molecular complex. In the present case, the complex is able to undergo a transition into an excited electronic state. The excitation energy of this transition often occurs in the UV-region of the electromagnetic spectrum, or sometimes towards the visible spectrum. Such a complex, which the inventors believe are charge-transfer complexes are referred to as complexes. However, in view of the theory of the inventor they may also be referred to as charge-transfer complexes.

In particular a complex is formed between the unpaired electrons of the nitrogen in the secondary amine and a C=C double bond with electron withdrawing group(s) adjacent. Such a C=C double bond is also referred to as an activated double bond. The complex has a certain characteristics regarding absorption of actinic radiation. When irradiating the complex with suitable wavelength(s) a reaction is initiated. The reaction can be viewed as a Aza-Michael addition. In general, no catalyst is required and in general no by products are formed.

It is a very important feature that the reaction is initiated by irradiation of the complex directly. The complex absorbs energy directly from the actinic radiation. No photoinitiator is required. Actually, addition of a photoinitiator is most often not suitable since it is likely to absorb actinic radiation, which then cannot be utilized for initiating the reaction. Only very small insignificant amount of UV-absorbing compounds such as photoinitiators should generally be tolerated. Amounts of photoinitiators which are normally used to initiate various reactions are generally too high. In one embodiment, no photoinitiators are added. A photoinitiator or another compound that absorbs actinic radiation is in one embodiment not be present at all. Under some conditions, certain amounts of certain photoinitiators can be tolerated. Such conditions include:

a) The wavelengths at which the complex absorbs energy is sufficiently far from the wavelengths at which the photoinitiator absorbs light. This is particularly true for complexes comprising two electron withdrawing groups such as those involving for instance maleic acid anhydride. For such complexes, their absorbance is often shifted towards longer wavelengths (i.e. lower energy) so that a photoinitiator absorbing mainly at shorter wavelengths (i.e. higher energy) can be tolerated. The photoinitiator does not absorb a significant amount of the actinic radiation in the relevant wavelength interval, allowing a reaction to be initiated in the complex.

b) The applied layer comprising a photoinitiator is very thin so that a sufficient amount of radiation reaches the complex anyway, and/or the applied layer comprising a photoinitiator is dilute so that a sufficient amount of radiation reaches the complex anyway.

The above conditions can also be combined with an increase in the intensity and/or dose of the actinic radiation.

The absorbed energy is determined by the extent of formation of complexes. With maleic anhydride the wavelength is shifted towards lower energy so that adhesion occurs even if a fraction of photoinitiator is in the solution. For acrylates there is required a higher energy which is blocked by photoinitiators or other chemical groups present in the mixture such as carbonyl, esters, aromatics etc. at normal use. This is most probably the reason that this effect has not been observed before.

In general, the levels of any photoinitiators or other absorbing compounds must not be so high that the reaction in the complex is not initiated. Thus in one embodiment a photoinitiator is present in an amount, which does not prevent initiating a reaction to form a covalent bond by reaction of nitrogen in the secondary amine and the carbon-carbon double bond. This limit has to be determined for each system depending on the absorbance of the complex and a photoinitiator.

For instance e-beam is not intended to be used to initiate the complex. Thus, e-beam is not used to initiate the reaction.

A covalent bond is formed as a result of the reaction.

The actinic radiation (typically UV-radiation) should reach the surface of the substrate where the complexes are located. This can be achieved by irradiation on the surface. In one embodiment, this can be achieved by irradiation through the substrate provided that it is transparent at the relevant wavelength and/or very thin. A solution comprising the compound comprising at least one C=C double bond should not absorb too much of the actinic radiation. The product of the thickness of such an applied solution and the absorption at the relevant wavelength should not be too high so that sufficient actinic radiation can reach the surface of the substrate where the complexes are. A higher absorption of radiation in such a solution can to some extent be compensated with a thinner applied solution.

The substrate is a cured substrate. It is conceived that for instance a melamine formaldehyde substrate is at least partially cured before the present method starts.

There is the possibility to form patterns on the substrate by only irradiating parts of the surface, where the complex is. In addition or alternatively it is possible to form patterns by applying the compound comprising at least one C=C double bond in a desired pattern.

In one embodiment, there is no reaction in the bulk of an applied solution, the reaction takes place only where the complexes have formed. Hence, the surplus can be removed after the reaction in such an embodiment.

In one embodiment, the at least one secondary amine is melamine formaldehyde. This corresponds to a substrate of melamine formaldehyde resin, or "melamine". In one embodiment, the secondary amine is urea formaldehyde. This corresponds to a substrate of urea-formaldehyde resin. In one embodiment the substrate comprises at least one selected from the group consisting of melamine formaldehyde resin, urea formaldehyde resin, poly paraphenylene terephthaiamide (Keviar®), and polyamide (Nylon®).

The electron withdrawing group is in one embodiment adjacent to the carbon-carbon double bond.

In one embodiment, there is an electron withdrawing group on both sides of the carbon-carbon double bond. Such compounds generally form stronger complexes.

In one embodiment, the electron withdrawing group is at least one selected from the group consisting of a triflyl group, a trihalide group, a cyano group, a sulfonate group, a nitro group, an ammonium group, an aldehyde group, a keto group, a carboxylic group, an acyl chloride group, an ester group, an amide group, and ether group, and a halide.

In one embodiment, the compound comprising at least one carbon-carbon double bond is at least one selected from the group consisting of maleic anhydride and maleimide.

In one embodiment, the compound comprising at least one carbon-carbon double bond is at least one selected from the group consisting of a maleate and a fumarate, i.e. maleic acid ester and fumaric acid ester. The compound is suitable dissolved in a solution when applied to the substrate.

In one embodiment, the compound comprising at least one carbon-carbon double bond is at least one selected from the group consisting of an acrylate and a methacrylate.

In one embodiment, the compound comprising at least one carbon-carbon double bond is provided in a solution. The solution is then added to the substrate surface in a desired thickness. The solution is applied as a layer on at least a part of the substrate surface, wherein the solution remains on the substrate surface during step c), wherein at least 1%, preferably at least 10%, more preferably at least 50% of the energy in the actinic radiation is transmitted through the layer of solution during step c) at the wavelength were the complex absorbs actinic radiation. The solution should not block the radiation (actinic radiation) from reaching the complexes at the substrate surface, at least not to any significant extent. The irradiation can be made through the solution if the solution does not block too much of the radiation energy. The energy is measured on the wavelengths where the complex absorb energy.

Although a reaction often takes place only where the complexes have formed, in an alternative embodiment there is additional polymerization in the bulk so that a film is formed. In one embodiment, the reaction of the complex initiates an anionic polymerization reaction. This occurs for instance when actinic radiation with sufficiently high intensity is used. In order to determine the required intensity, the intensity can be increased until a bulk polymerization reaction occurs. Anions are formed which propagate into the bulk. The anions initiate a polymerization reaction in the bulk of compounds comprising C=C double bonds. In such an embodiment, a polymerizable substance comprising at least one C=C double bond is added in a layer on the substrate surface. Such a chain reaction is partially or fully extending into the bulk of the layer. Such a polymerizable substance is typically a monomer or could also be a polymerizable oligomer with a C=C bond. In one embodiment a polymerizable substance comprising at least one C=C bond is added in at least a surrounding on the substrate, wherein the initiation of the complexes in step c) further initiates a polymerization reaction of the polymerizable substance by formation of anions.

In one embodiment, any surplus of the compound comprising at least one carbon-carbon double bond is removed after step c).

In one embodiment, the thickness of an applied coating comprising the compound comprising at least one carbon-carbon double bond and the absorbance of the coating at the wavelength of the actinic radiation are adapted so that the reaction is still initiated in step c).

In one embodiment the compound comprising at least one carbon-carbon double bond is:

a) at least 16 wt % of at least one compound selected from the group consisting of an unreacted organic acid anhydride, an ester of maleic acid anhydride, an ester of fumaric acid anhydride, and maleimide, and b) at least 10 wt % of at least one from:
  i) at least one compound comprising a (meth)acrylate group, wherein the average number of (meth)acrylate groups per molecule is larger than 1, and
  ii) at least one compound selected from polyfunctional allyl compounds and vinylether.

In one embodiment there is provided a method of coating a substrate, said method comprising the steps of
  a) providing a substrate,
  b) applying a coating composition to at least a part of the substrate, said coating composition comprising at least 10 wt % of at least one compound comprising a (meth)acrylate group, wherein the composition fulfils at least one of the conditions selected from; i) the average number of (meth)acrylate groups per molecule is larger than 1, and ii) the coating composition comprises polyfunctional allyl compounds or vinylether, said coating composition comprising at least one photoinitiator, and said coating composition comprising at least 16 wt % of at least one compound selected from the group consisting of an unreacted organic acid anhydride, an ester of maleic acid anhydride, an ester of fumaric acid anhydride, and maleimide, and
  c) initiating a polymerisation reaction in at least a part of the applied coating composition by subjecting at least a part of the applied coating to actinic radiation and heat.

In the above method, it is conceived that the photoinitiator should not absorb actinic radiation in such a spectrum and to such an extent that the initiation of the complex is blocked. This is solved by selecting a suitable photoinitiator. Further, the above method comprises for instance organic acid anhydride, an ester of maleic acid anhydride, an ester of fumaric acid anhydride, and maleimide. These compounds give a complex with an absorbance shifted towards a longer wavelength making it possible to use a UV-photoinitiator with an absorbance at a higher wavelength. This this embodiment is an exception where it is possible to use a photoinitiator.

In a second aspect there is provided a substrate coated according to the method described above.

In one embodiment, a second coating is applied after step c). This second coating can be referred to as a top-coat if no further coatings are to be applied. The properties of the resulting finished coated substrate including the top-coat is drastically improved when using the present method. In one embodiment, at least one further coating is applied after step c). Thus the coating is used as a primer in one embodiment. The coating can also be used as a single coating or as a top coat on another coating.

In one embodiment the coating is a thin layer since there is no reaction in bulk. Only the complexes are then transformed to covalent bonds. The coating in this embodiment can thus be viewed as a surface treatment because the applied layer is very thin. The order of magnitude of the thickness corresponds to one molecule in such an embodiment. Because of the covalent bonding with the substrate, there is no or essentially no formation of covalent bonds above the substrate surface in this particular embodiment, and thus no cross linked film is formed in such an embodiment. The coating should in this embodiment be viewed as a very thin coating of covalently attached molecules. The thickness in this embodiment roughly corresponds to the size of the covalently attached molecules.

In an alternative embodiment an optional component is added to the substrate surface. Such an optional component is able to bind to the covalently attached molecules with non-covalent bonds, such as dipole-dipole bonds. Thereby a film is formed on the substrate surface. In one embodiment the thickness of such a film is in the interval 50-200 nm. In one embodiment the optional component comprises cellulose.

In one embodiment, an acrylate based coating is applied as the at least one further coating, i.e. the second coating.

In one embodiment, a solution comprising the at least one C=C double bond is applied with a thickness in the range 1-100 µm, the thickness being measured directly after application of the coating composition. The average thickness is considered. If the coating is not applied with a uniform thickness the average thickness is calculated as if the coating would have been applied with an even thickness over the surface. After step c) the remaining unattached molecules can be removed. Thus the resulting attached layer is generally much thinner than the applied solution in step b)

In one embodiment, step c) is performed so that only a partial reaction occurs, wherein at least one further coating is applied after step c), and wherein a further initiation of a reaction is performed after application of the at least one further coating. It is intended that the further initiation completes the reaction.

Other features and uses of the invention and their associated advantages will be evident to a person skilled in the art upon reading the description and the examples.

It is to be understood that this invention is not limited to the particular embodiments shown here. The embodiments are provided for illustrative purposes and are not intended to limit the scope of the invention since the scope of the present invention is limited only by the appended claims and equivalents thereof.

EXAMPLES

All percentages are calculated by weight throughout the description and the claims.

Example 1

Pure hexanediol diacrylate (HDDA) was applied in an approximately 6 µm thick layer on a melamine flooring surface using an applicator rod. The melamine with the HDDA layer was put in a curing device comprising a conveyor belt and a fixed medium pressure mercury lamp that gives light in UVA, UVB, UVC and UVV. The UV dose was measured to be 1.5 J/cm$^2$ (UVA) Hg spectrum. Since HDDA does not contain photoinitiator, it was still liquid and non-reactive on the melamine surface and needed to be removed to avoid blending with the next layer (top coat). Unreacted acrylate was rinsed with acetone and dried with paper. This was repeated once.

A UV-curing acrylate-based topcoat from Bona AB was then applied and cured at 1.5 J/cm$^2$. The adhesion to the substrate was tested with a device specifically intended for adhesion tests of thin films, a Hamberger Hobel. Values above 20N are considered commercially acceptable and values above 30N are better than all parquet floors in the market.

Result: 40N Hamberger.

A standard tape test was also performed. There were made cuts through the coating to the substrate in a square pattern with 25 areas each being approximately 1 mm². A standard packing tape was pressed onto the coating and pulled off quickly. The resulting damage was estimated by counting the number of 1 mm² pieces that are removed. The rating 0 was given for no noticeable change and the score 5 corresponds to that all areas have been removed.

Result: 0 Crosshatch.

Several experiments with exactly the same method have been done with maleic anhydride dissolved in DMSO, diethyl maleate dissolved in DMSO and HDDA dissolved in DMSO and all provide the same good adhesion as above.

A common UV curing coating (containing acrylates, fillers, photoinitiators and additives) from Bona AB was diluted with DMSO (dimethylsulfoxide) to 10% acrylate in 90% DMSO. Same method as above.

Adhesion and crosshatch: same good results.

At 24 μm application thickness (2.4 μm after the solvent had disappeared), adhesion deteriorated drastically. Hamberger<10N and Crosshatch 5.

Example 2

A mixture of 1% tripropylene glycol diacrylate (TPGDA), 1.5% cellulose thickener, 0.1% SDBS (surface active agent for better effluence) and 97% tap water was applied in the same manner as in the first example. The melamine was not washed with acetone since a dry surface was obtained after evaporation of the water, which occurs during the illumination. A dose of 1.5 J/cm² was used. Immediately after the UV curing, 6 μm Bona topcoat was applied and cured 1.5 J/cm².

Hamberger 40N, Crosshatch 0

Example 3

In the same manner as in Example 1, TATATO (1,3,5-Triallyl-1,3,5-triazine-2,4,6 (1H, 3H, 5H)-trione), DVE3 (triethylene glycol divinyl ether), TAOE (tetraallyloxy ethane) were tested.

Result: TATATO 30N Hamberger, DVE3 and TAOE 15N Hamberger.

Example 4

To test the wavelength dependence of different double bonds, a 365 nm LED lamp was used with 17 mJ/cm² intensity.

A mixture of 1% tripropylene glycol diacrylate (TPGDA), 1.5% cellulose thickener, 0.1% SDBS (surface active agent for better effluence) and 97% tap water was applied in the same manner as in the first example. The melamine was not washed with acetone since a dry surface was obtained after evaporation of the water, which occurs during the illumination of 120 s 365 nm LED (approx. 2 J/cm²). Immediately after the UV light, 6 μm Bona topcoat was applied and cured 1.5 J/cm2.

Hamberger 10N Crosshatch 4

Example 5

A mixture of 1% vinylacetate, 1.5% cellulose thickener, 0.1% SDBS (surface active agent for better effluence), 5% PEG 8000 and 92% tap water was applied in the same manner as in the first example. The melamine was not washed with acetone since a dry surface was obtained after evaporation of the water, which occurs during the illumination of 120 s 365 nm LED (approx. 2 J/cm²). Immediately after the UV light, 6 μm Bona topcoat was applied and cured 1.5 J/cm².

Hamberger 5N Crosshatch 5

Example 6

A mixture of 1% diethyl maleate, 1.5% cellulose thickener, 0.1% SDBS (surface active agent for better effluence), 5% PEG 8000 and 92% tap water was applied in the same manner as in the first example. The melamine was not washed with acetone since a dry surface was obtained after evaporation of the water, which occurs during the illumination of 120 s 365 nm LED (approx. 2 J/cm²). Immediately after the UV light, 6 μm Bona topcoat was applied and cured 1.5 J/cm².

Hamberger 45N Crosshatch 0

Example 7

A mixture of 1% diethyl maleate, 1.5% cellulose thickener, 0.1% SDBS (surface active agent for better effluence), 5% PEG 8000 and 92% tap water was applied in the same manner as in the first example. The melamine was not washed with acetone since a dry surface was obtained after evaporation of the water, which occurs during the illumination of 120 s 395 nm LED (approx. 8 J/cm²). Immediately after the UV light, 6 μm Bona topcoat was applied and cured 1.5 J/cm².

Hamberger 0N Crosshatch 5

Example 8

The following mixes were prepared; 100% SR344 (SR344 is a polyethylene glycol (400) diacrylate), 75% SR344 and 25% tap water, 50% SR344 and 50% tap water, 25% SR344 and 75% tap water, 0% SR344 and 100% tap water respectively. The respective mixture was applied in 6, 12 and 24 μm thick layers on different melamine flooring surfaces respectively. A dose of 630 mJ/cm² was used. Excess primer was washed twice with paper and acetone. Immediately after UV curing and wash, 6 μm Bona topcoat was applied and cured 1.5 J/cm². The results can be seen in Table 1.

TABLE 1

Crosshatch and Hamberger results of melamine flooring surfaces with different thick layers (6, 12 and 24 μm) of 0% SR344, 25% SR344, 50% SR344, 75% SR344 and 100% SR344.

|  | 0 wt % SR344 | 25 wt % SR344 | 50 wt % SR344 | 75 wt % SR344 | 100% SR344 |
|---|---|---|---|---|---|
| 6 μm | Crosshatch 5<br>Hamberger < 6N | Crosshatch 0<br>Hamberger 21N | Crosshatch 0<br>Hamberger 11N | Crosshatch 0<br>Hamberger 14N | Crosshatch 2<br>Hamberger 7N |

TABLE 1-continued

Crosshatch and Hamberger results of melamine flooring surfaces with different thick layers
(6, 12 and 24 μm) of 0% SR344, 25% SR344, 50% SR344, 75% SR344 and 100% SR344.

|  | 0 wt % SR344 | 25 wt % SR344 | 50 wt % SR344 | 75 wt % SR344 | 100% SR344 |
|---|---|---|---|---|---|
| 12 μm | Crosshatch 5 Hamberger < 6N | Crosshatch 0 Hamberger 16N | Crosshatch 0 Hamberger 10N | Crosshatch 1 Hamberger 6N | Crosshatch 5 Hamberger < 6N |
| 24 μm | Crosshatch 5 Hamberger < 6N | Crosshatch 5 Hamberger < 6N | Crosshatch 2 Hamberger < 6N | Crosshatch 2 Hamberger < 7N | Crosshatch 5 Hamberger < 6N |

Example 9

A mixture of 2% SR344, 1.5% cellulose thickener, 0.1% SDBS (surface active agent for better effluence) and 96% tap water was applied in a 6 μm thick layer on the melamine flooring surface. The melamine surfaces were not washed with acetone since a dry surface was obtained after a minute. No irradiation was applied. Immediately after 6 μm Bona topcoat was applied and cured 1.5 J/cm$^2$.

Hamberger 6N Crosshatch 2

Example 10

A mixture of 2% SR344, 1.5% cellulose thickener, 0.1% SDBS (surface active agent for better effluence) and 96% tap water was applied in a 6 μm thick layer on the melamine flooring surface. This time, the melamine surfaces were not washed with acetone since a dry surface was obtained after the evaporation of the water, which occurs during the illumination. A dose of 53 mJ/cm$^2$ was used. Immediately after the UV illumination, 6 μm Bona topcoat was applied and cured 1.5 J/cm$^2$.

Hamberger 45N Crosshatch 0

Example 11

A mixture of 2% SR344, 1.5% cellulose thickener, 0.1% SDBS (surface active agent for better effluence) and 96% tap water was applied in a 6 μm thick layer on the melamine flooring surface. This time, the melamine surfaces were not washed with acetone since a dry surface was obtained after the evaporation of the water, which occurs during the illumination. A dose of 53 mJ/cm$^2$ was used. The melamine flooring surface was allowed to be in room temperature for 8 days before 6 μm Bona topcoat was applied and cured 1.5 J/cm$^2$.

Hamberger 28 N Crosshatch 0

Example 12

A mixture of 2% SR344, 1.5% cellulose thickener, 0.1% SDBS (surface active agent for better effluence) and 96% tap water was applied in a 6 μm thick layer on the melamine flooring surface. This time, the melamine surfaces were not washed with acetone since a dry surface was obtained after the evaporation of the water, which occurs during the illumination. A dose of 29 mJ/cm$^2$ was used. Immediately after the UV light, 6 μm Bona topcoat was applied and cured 1.5 J/cm$^2$.

Hamberger 45N Crosshatch 0

Example 13

A mixture of 2% SR344, 1.5% cellulose thickener, 0.1% SDBS (surface active agent for better effluence) and 96% tap water was applied with 6 μm thick layers of 4 different melamine flooring surfaces. The surfaces were allowed to heat-cured in the oven at 50° C. for 15 min, 30 min, 45 min and 60 min, respectively. Immediately after heat setting, 6 μm Bona topcoat was applied and cured 1.5 J/cm$^2$ on all samples except for the floor surface previously thermosetting for 60 minutes. This sample was allowed to room temperature for 8 days before 6 μm Bona topcoat was applied and cured 1.5 J/cm$^2$. The result can be seen in Table 2.

TABLE 2

Crosshatch and Hamberger results from melamine flooring surfaces exposed to different times of heat curing.

| Heat hardening of Primer | Crosshatch | Hamberger |
|---|---|---|
| 15 min | 0 | 12N |
| 30 min | 0 | 10N |
| 45 min | 0 | 16N |
| 60 min + 8 days at room temperature | 3 | 9N |

A mixture of 5% SR344, 1.5% cellulose thickener, 0.1% SDBS (surface active agent for better effluence) and 93% tap water was applied in a 6 μm thick layer on the melamine flooring surface. The melamine surfaces were not washed with acetone since a dry surface was obtained after the evaporation of the water, which occurs during the illumination. A dose of 800 mJ/cm$^2$ was used. Immediately after the UV light, 6 μm Bona topcoat was applied and cured 1.5 J/cm$^2$.

Hamberger 45N Crosshatch 0

Thus: An activated double bond (electron-deficient) in contact with melamine laminate provides very good adhesion if a sufficient UV dose with the right energy is reaching down to the complex. Even less favourable double bonds provide some improved adhesion at high UV doses with energy-rich light (UVC, UVB).

The energy is determined by how good complexes are formed. With maleic anhydride, the wavelength was shifted to lower energy so that adhesion occurs even when a lot of photoinitiator was present in the mixture. The photoinitiator then had a different absorption wavelength allowing at least some actinic radiation with the right wavelength to reach the complex. With acrylates, higher energy was required, which was blocked by photoinitiator at normal application rates. This is probably one reason why this has not been observed before.

The invention claimed is:
1. A method of coating a substrate, said method comprising the steps of a) providing a substrate, said substrate comprising at least one secondary amine, at least a fraction of the at least one secondary amines is at the surface of the substrate,
b) contacting the substrate surface with a compound comprising at least one carbon-carbon double bond, wherein an electron withdrawing group is on at least one side of the carbon-carbon double bond, so that a complex is formed between nitrogen in the secondary amine and the carbon-carbon double bond, and
c) initiating a reaction to form a covalent bond by reaction of nitrogen in the secondary amine and the carbon-carbon double bond, by subjecting at least a part of the formed complexes to actinic radiation, wherein the wavelength of the actinic radiation is adapted to be absorbed by the complex.

2. The method according to claim 1, wherein the substrate comprises at least one selected from the group consisting of melamine formaldehyde resin, urea formaldehyde resin, poly paraphenylene terephthalamide, and polyamide.

3. The method according to claim 1, wherein there is an electron withdrawing group on both sides of the carbon-carbon double bond.

4. The method according to claim 1, wherein the electron withdrawing group is at least one selected from the group consisting of a triflyl group, a trihalide group, a cyano group, a sulfonate group, a nitro group, an ammonium group, an aldehyde group, a keto group, a carboxylic group, an acyl chloride group, an ester group, an amide group, an ether group, and a halide.

5. The method according to claim 1, wherein the compound comprising at least one carbon-carbon double bond is at least one selected from the group consisting of maleic anhydride and maleimide.

6. The method according to claim 1, wherein the compound comprising at least one carbon-carbon double bond is at least one selected from the group consisting of a maleate and a fumarate.

7. The method according to claim 1, wherein the compound comprising at least one carbon-carbon double bond is at least one selected from the group consisting of an acrylate and a methacrylate.

8. The method according to claim 1, wherein the compound comprising at least one carbon-carbon double bond is provided in a solution, wherein the solution is applied as a layer on at least a part of the substrate surface, wherein the solution remains on the substrate surface during step c), and wherein at least 1% of the energy in the actinic radiation is transmitted through the layer of solution during step c) at the wavelength where the complex absorbs actinic radiation.

9. The method according to claim 1, wherein any surplus of the compound comprising at least one carbon-carbon double bond is removed after step c).

10. The method according to claim 1, wherein the thickness of an applied coating comprising the compound comprising at least one carbon-carbon double bond and the absorbance of the coating at the wavelength of the actinic radiation are adapted so that the reaction is still initiated in step c).

11. The method according to claim 1, wherein a second coating is applied after step c).

12. The method according to claim 1, wherein the compound comprising at least one carbon-carbon double bond is:
a) at least 16 wt % of at least one compound selected from the group consisting of an unreacted organic acid anhydride, an ester of maleic acid anhydride, an ester of fumaric acid anhydride, and maleimide, and
b) at least 10 wt % of at least one from:
i) at least one compound comprising a (meth)acrylate group, wherein the average number of (meth)acrylate groups per molecule is larger than 1, and
ii) at least one compound selected from polyfunctional allyl compounds and vinylether.

13. The method according to claim 1, wherein a polymerizable substance comprising at least one C=C bond is added in at least a surrounding on the substrate, wherein the initiation of the complexes in step c) further initiates a polymerization reaction of the polymerizable substance by formation of anions.

14. The method according to claim 8, wherein at least 10% of the energy in the actinic radiation is transmitted through the layer of solution during step c) at the wavelength where the complex absorbs actinic radiation.

15. The method according to claim 8, wherein at least 50% of the energy in the actinic radiation is transmitted through the layer of solution during step c) at the wavelength where the complex absorbs actinic radiation.

* * * * *